United States Patent [19]

Kumazaki

[11] Patent Number: 5,088,911
[45] Date of Patent: Feb. 18, 1992

[54] INJECTION MOLDING APPARATUS FOR CONTROLLING MOLDING OPTIMUM CONDITION IN RESPONSE TO TEMPERATURE

[75] Inventor: Hiroshi Kumazaki, Numazu, Japan

[73] Assignee: Toshiba Kikai Kabushiki Kaisha, Tokyo, Japan

[21] Appl. No.: 468,708

[22] Filed: Jan. 23, 1990

[30] Foreign Application Priority Data

Feb. 2, 1989 [JP] Japan .................. 1-24371

[51] Int. Cl.⁵ .............................. B29C 45/77
[52] U.S. Cl. ..................... 425/145; 264/40.6; 425/155; 425/170
[58] Field of Search ........... 264/40.1, 40.5, 40.6, 264/40.7, 328.1, 328.16; 425/135, 143, 144, 145, 149, 155, 162, 166, 170

[56] References Cited

U.S. PATENT DOCUMENTS

| | | | |
|---|---|---|---|
| 3,822,867 | 7/1974 | Evans | 264/40.6 |
| 3,924,840 | 12/1975 | Nelson, Jr. | 264/40.6 |
| 4,094,940 | 6/1978 | Hold | 264/40.6 |
| 4,849,143 | 7/1989 | Langecker | 264/40.1 |

*Primary Examiner*—Jill L. Heitbrink
*Attorney, Agent, or Firm*—Koda and Androlia

[57] ABSTRACT

An apparatus for operating an injection machine wherein the molding condition during the building up interval is automatically changed in accordance with such parameters as the metal mold temperature, resin temperature and the temperature of a portion of the heating cylinder to which resin is supplied from a hopper. The apparatus is constructed to facilitate the building up of the molding condition, thus decreasing the number of useless shots.

3 Claims, 2 Drawing Sheets

5,088,911

INJECTION MOLDING APPARATUS FOR CONTROLLING MOLDING OPTIMUM CONDITION IN RESPONSE TO TEMPERATURE

BACKGROUND OF THE INVENTION

This invention relates to a method and apparatus for operating an injection molding machine, and more particularly a method and apparatus for operating an injection molding machine capable of efficiently and smoothly building up the molding conditions from the start of the injection molding operation to a time at which stable molding operation can be effected in an interval in which a metal mold is exchanged and a normal operation is resumed.

Heretofore the building up interval was considered as a useless interval necessary for reaching a stable operating condition, that is an interval in which satisfactory products cannot be produced. In the building up interval, it has been the practice to perform injection molding operations of several tens of shots with constant molding conditions including injection pressures, injection speed which do not destroy the metal mold, or the operator has changed the molding conditions by manually changing injection pressures and injection speeds according to the feeling and experience of the operator. In Japanese Laid Open Patent Specification No. 189131 of 1987, there is disclosed a method of gradually changing the molding conditions from the initial condition to a stable condition by changing the molding condition for each shot by a value corresponding to a quotient obtained by dividing the difference between the values of the initial molding condition and the stable molding condition with the number of shots.

As above described, where the molding conditions during the building up interval are made constant it has been impossible to determine optimum molding conditions necessary for molding satisfactory products because it is necessary to avoid breakage of the metal mold, which results in defective products during the building up interval. Where the operator changes the molding conditions according to his feeling, good products can be obtained during the building up interval. But this method is troublesome. Moreover, the method disclosed in Japanese Laid Open Patent Specification No. 189131 of 1987 is not satisfactory and requires many shots that produce unsatisfactory products.

The inventor has made exhaustive research regarding a building up method capable of producing good products as fast as possible without relying upon the feeling or experience of the operator and found that the molding conditions enabling to obtain good products at the time of building up are dependent upon the metal mold temperature, resin temperature and the temperature of a portion of a heating cylinder just beneath a raw material supply hopper, respectively.

SUMMARY OF THE INVENTION

Accordingly, it is an object of this invention to provide a novel method and apparatus for operating an injection molding machine capable of automatically and accurately changing the molding condition during the building up interval until a stable molding condition is reached thus decreasing as far as possible the number of useless shots during the building up interval.

Another object of this invention is to provide a novel method and apparatus for operating an injection molding machine capable of facilitating the building up of the molding condition, thus decreasing the number of useless shots and increasing the operating efficiency.

According to one aspect of this invention there is provided a method of controlling building up of a molding condition of an injection molding machine from a start of the injection molding operation to a time at which a stable molding operation becomes possible, the method comprising the steps of determining a relation between a variation in one or more values of a metal mold temperature of the injection molding machine, a resin temperature, and a temperature at a portion of the heating cylinder of the injection molding machine beneath a hopper which supplies a raw material into the heating cylinder, and a variation in optimum molding conditions corresponding to the firstly mentioned variation, storing the relation between the values of the temperatures and the optimum molding condition in memory means, detecting a temperature at a portion corresponding to one of the values of the temperatures at the time of building up an injection molding operation, selecting an optimum molding condition corresponding to the detected temperature among the optimum molding conditions being stored in the memory means, and performing injection molding operations by sequentially varying the molding conditions in accordance with the selected optimum molding condition.

According to another aspect of this invention there is provided apparatus for operating an injection molding machine comprising means for determining a relation between variations in one or more values of a metal mold temperature of the injection molding machine, a resin temperature, and a temperature at a portion of a heating cylinder of the injection molding machine beneath a hopper which supplies a raw material resin into the heating cylinder, and a variation in the optimum molding conditions corresponding to the firstly mentioned variation, memory means for storing the relation between the values of the temperatures and the optimum molding condition, temperature detecting means for detecting the temperatures at portions corresponding to the values of the temperatures, molding condition setting means including a comparator for comparing output signals of the temperature detecting means with the values of the temperatures, the molding condition setting means setting an optimum molding condition corresponding to the output signals of the temperature detecting means and being stored in the memory means, and control means for controlling the operation of the injection molding machine in accordance with the optimum molding condition set by the molding condition setting means.

DESCRIPTION OF THE PREFERRED EMBODIMENT

Figure 1:
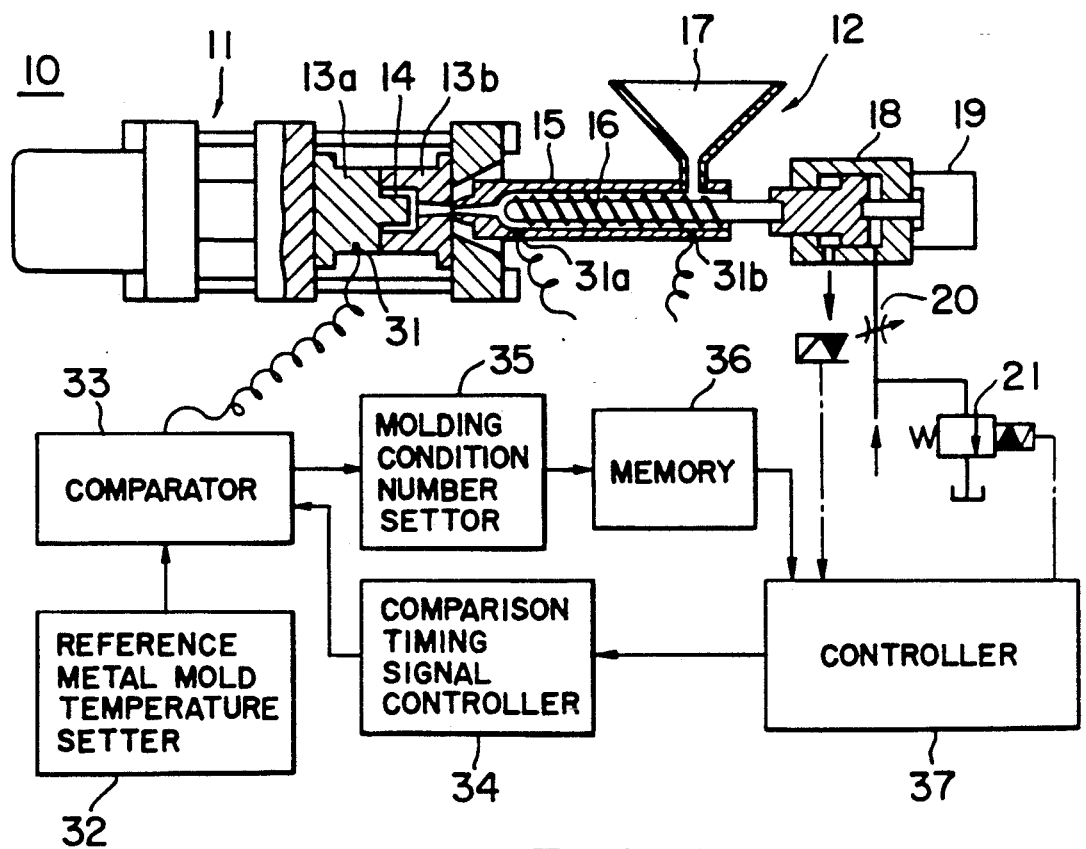
FIG. 1 is a diagrammatic view, partly in section and partly in blocks, showing the construction of a building up device for use in an injection molding machine.

An injection molding machine 10 shown in FIG. 1 comprises a mold clamping device 11 and an injection device 12. More particularly the metal mold is constituted by a movable metal mold 13a and a stationary metal mold 13b which when closed together define therebetween a mold cavity 14. The injection device 12 comprises a heating cylinder 15, a screw 16 reciprocating therein, a raw material supply hopper 17, an injection cylinder 18 for reciprocating the screw 16 through heating cylinder 15, a screw rotating motor 19, in the form of an electric motor or a hydraulic motor, a flow quantity adjusting valve 20 which controls the quantity of pressurized oil supplied to injection cylinder 18 and a pressure adjusting valve 21 which controls the pressure of the pressurized oil supplied to the injection cylinder. Since various elements described above are well known in the art, detailed description thereof is believed unnecessary.

A temperature detector 31 in the form of a thermocouple, for example, is embedded in the movable metal mold 13a or the stationary metal mold 13b for detecting the temperature t of the movable metal mold.

An electric control system utilized for the injection molding machine comprises a reference metal mold temperature setter 32 for setting metal mold temperature from the start of the injection molding operation to a point at which stable molding can be made. More particularly, the temperature setter 32 sets a reference metal mold temperature T corresponding to a metal mold temperature t at the position of the temperature detector 31, the reference temperature T being set from a temperature $T_1$ at the time of starting the injection molding operation to a temperature $T_n$ at a point at which stable injection becomes possible.

The electric control system further comprises a comparator 33 which compares the output of the temperature detector 31, that is, the metal mold temperature t with the reference metal mold temperatures $T_l \sim T_n$ set in the reference metal mold temperature setter 32 under the control of the output signal of a comparison timing signal controller 34, and a molding condition number setter 35 which sets "i" as a molding condition number when the comparator 33 produces an output expressed by a relation $T_i < t < T_i + 1$.

There is further provided memory means 36 which stores reference metal mold temperatures $T_l \sim T_n$ during the building up interval, optimum molding conditions for each of these temperatures $T_l \sim T_n$, more particularly the number of screw revolutions $N_l \sim N_n$ or injection speeds $V_l \sim V_n$ capable of obtaining only good products as far as possible without destroying metal molds 13a and 13b, injection pressures $P_l \sim P_n$ and the numbers of screw rotations $N_l \sim N_n$, with reference to various injection molding models corresponding to the shape and size of the molded products and the type of the resin used.

A controller 37 is provided for controlling the operation of the injection molding machine 10, and for setting the degree of opening of a flow quantity adjusting valve 20 to obtain the injection speed $V_i$ and the injection pressure $P_i$ according to the most optimum molding condition among molding conditions (i) set by the molding condition number setter 35 and stored in the memory means 36 and for setting the number of revolutions of the screw rotating motor 19 necessary to obtain an optimum number of rotations $N_i$ of the screw, wherein $N_i$ is determined by the molding condition. Other molding conditions can also be set by the controller 37.

The apparatus described above operates as follows.

At first, the most optimum molding condition of an injection molding model coinciding with the present injection molding operation is stored in memory means 36. Then the heating cylinder 15 is heated, the screw 16 is rotated and the raw material resin is supplied from hopper 17 for initiating plasticization of the resin. When a predetermined quantity of molten resin has been stored at the front end of the heating cylinder 15, the injection operation is commenced.

Before initiation of the injection operation, the comparison timing signal controller 34 is operated by an output of controller 37 for comparing metal mold temperature t with one of the reference metal mold temperatures $T_l \sim T_n$. The metal molds 13a and 13b are preheated to a suitable temperature and mounted on the mold clamping device 11. Thereafter, the metal molds are heated to a temperature lower than that of the stable molding temperature by a metal mold temperature adjuster, not shown.

When the result of comparison between the metal mold temperature t and the reference metal mold temperature $T_l \sim T_n$ is $t < t_l$, no injection operation is performed. A predetermined time after, the temperature comparison is made again and when the result of comparison is $T_1 < t < T_2$, the molding condition number setter 35 selects a molding condition number [1] with the result that an injection speed $V_1$, an injection pressure $P_1$, etc. which are the optimum molding condition of the molding condition number [1] stored in memory means 35 are given to the controller 37. In response to optimum condition signals, the controller 37 varies the degree of opening of the flow quantity adjusting valve 20 and the set pressure of the pressure adjusting valve in accordance with the injection speed $V_1$, the injection pressure $P_1$, etc., thus effecting an optimum injection operation.

Figure 2:
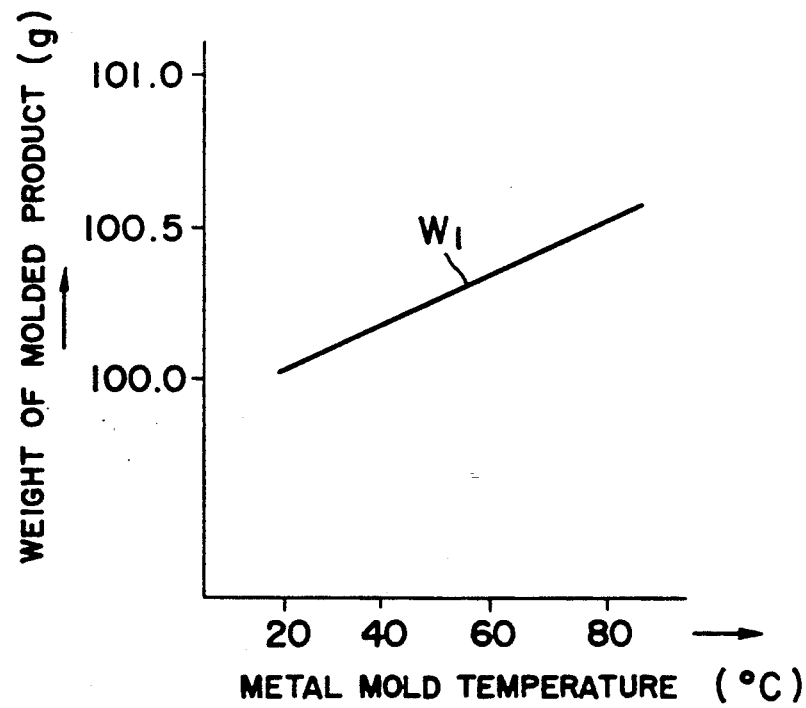
FIGS. 2, 3 and 4 show characteristic curves respectively showing relations between the metal mold temperature and the weight of the molded product, between the resin temperature and the weight of the molded product, and between the temperature of a portion of a heating cylinder beneath a raw material supply hopper, and the weight of the molded product.

The relationship between the metal mold temperature t and the optimum molding condition at that temperature is predetermined and stored in memory means as above described. The relationship between the metal mold temperature t and the molded product weight that determines good or not of the molded product is shown by a straight line $W_1$ shown in FIG. 2. FIG. 2 shows a case in which the molding condition is maintained at a constant value whereby as the metal mold temperature increases, the weight of the molded product increases. The fact that the weight of the molded product is less than a prescribed value shows that the molten resin is not perfectly filled in the mold cavity 14, so that it is usual to set the optimum molding condition (a molding condition under which the weight of the molded product is held always constant even when the metal mold temperature varies) such that where the metal mold temperature t is low the injection speed V and the injection pressure P would be high.

After completion of the first injection operation and prior to the second injection operation, the comparison timing signal controller 34 is operated again for detecting the metal mold temperature t. In the same manner, as above described- an injection molding condition (i) corresponding to that metal mold temperature t is selected for effecting the second molding operation.

It is true that the optimum molding condition is not always selected to obtain a good product from the first operation in view of the reference metal mold temperature $T_1$ which is the lowest one among the reference metal mold temperatures $T_1 \sim T_n$ and the molding conditions include a molding condition necessary for increasing the metal mold temperature t with a lesser number of shots while preventing breakage of the metal molds 13a and 13b. According to the apparatus of this invention, the injection operation can be made under the optimum molding condition necessary to obtain good products earlier than a time at which the metal mold temperature t approaches a temperature close to a temperature necessary for effecting stable injection molding operations. In other words, according to this invention, it is possible to obtain good products before reaching the stable molding condition.

Figure 3:
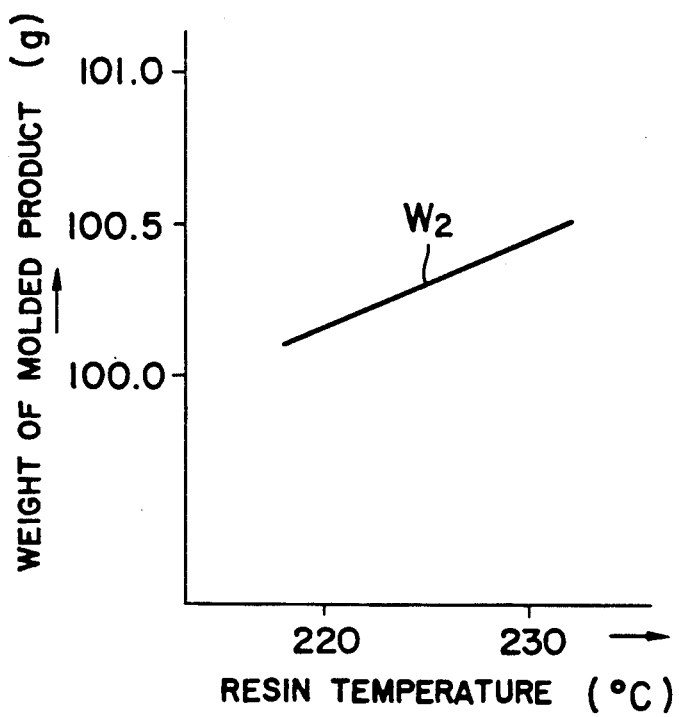
Figure 4:
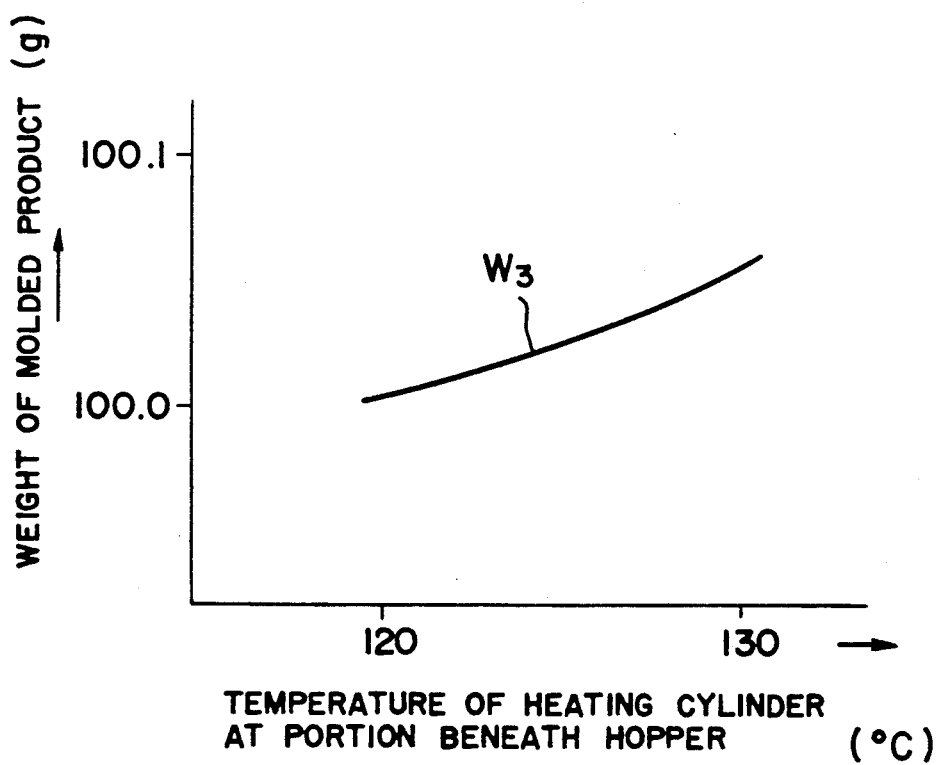

The embodiment described above shows an example in which the optimum molding condition was determined by the metal mold temperature t. However, according to the research of the inventor, as shown by lines $W_2$ and $W_3$ shown in FIGS. 3 and 4, it was found that the weight of the molded products that determines good or bad of the quality of the molded products is related to the resin temperature and the temperature of a portion of the heating cylinder 15 beneath the hopper 17. For this reason, as shown in FIG. 1, a temperature detector 31a is provided for the front end of the heating cylinder 15 for detecting the resin temperature. Alternatively, a temperature detector 31b is provided for detecting the temperature of the heating cylinder 15 at a portion beneath the hopper 17, thus setting the optimum molding condition corresponding to the temperatures produced by these temperature detectors 31a and 31b. Where the optimum molding condition is set according to the temperatures of a plurality of parts of the injection molding machine better building up can be obtained.

As above described, according to this invention it becomes possible to readily and smoothly effect building up of the injection molding operations which has required rich experiences and has been difficult to realize. Moreover, it is possible to decrease the number of useless shots thus ensuring highly efficient injection molding operations.

I claim:
1. Apparatus for operating an injection molding machine controlled by an electric control system comprising:

a reference metal mold temperature setter for setting metal mold temperatures from start of an injection molding operation to a point at which a stable molding operation can be made;

a means for sensing a temperature of said metal mold;

a comparator which compares a signal representing a temperature of a metal mold of said injection molding machine with a reference metal mold temperature set by said reference metal mold temperature setter;

a comparison timing signal controller which controls operation of said comparator;

a molding condition setter which sets a molding condition in response to an output signal of said comparator;

memory means which stores a reference metal mold temperature during a building up interval, and an optimum molding condition for said reference metal mold temperature; and a controller for controlling the operation of said injection molding machine so as to set a degree of opening of a flow quantity adjusting valve to obtain an injection speed according to an optimum molding condition set by said molding condition setter, and to operate said comparison timing signal controller.

2. The apparatus according to claim 1 wherein said optimum molding condition consists of an injection speed capable of obtaining good molded products without destroying said metal mold, an injection pressure and a number of screw rotations, with respect to various injection models corresponding to a shape and size of said molded product and a type of the resin used.

3. The apparatus according to claim 1 wherein said controller sets a number of revolutions of a screw rotating motor necessary to obtain an optimum number of revolutions of said screw.

* * * * *